(12) United States Patent
Kozina

(10) Patent No.: US 7,054,887 B2
(45) Date of Patent: May 30, 2006

(54) METHOD AND SYSTEM FOR OBJECT REPLICATION IN A CONTENT MANAGEMENT SYSTEM

(75) Inventor: Gerald Edward Kozina, Cupertino, CA (US)

(73) Assignee: IBM Corporation, Armonk, NY (US)

( * ) Notice: Subject to any disclaimer, the term of this patent is extended or adjusted under 35 U.S.C. 154(b) by 567 days.

(21) Appl. No.: 10/011,181

(22) Filed: Nov. 9, 2001

(65) Prior Publication Data

US 2002/0174200 A1    Nov. 21, 2002

Related U.S. Application Data

(60) Provisional application No. 60/265,187, filed on Jan. 30, 2001.

(51) Int. Cl.
*G06F 7/00* (2006.01)

(52) U.S. Cl. .................. 707/104.1; 707/10; 707/100

(58) Field of Classification Search ......... 707/1–104.1, 707/200–204
See application file for complete search history.

(56) References Cited

U.S. PATENT DOCUMENTS

| | | | | |
|---|---|---|---|---|
| 4,714,992 A | | 12/1987 | Gladney et al. | 707/206 |
| 4,714,996 A | | 12/1987 | Gladney et al. | 707/203 |
| 5,627,961 A | | 5/1997 | Sharman | 714/6 |
| 5,649,185 A | * | 7/1997 | Antognini et al. | 707/9 |
| 5,684,984 A | | 11/1997 | Jones et al. | 707/10 |
| 5,787,262 A | | 7/1998 | Shakib et al. | 707/205 |
| 5,787,413 A | * | 7/1998 | Kauffman et al. | 707/2 |
| 5,787,442 A | | 7/1998 | Hacherl et al. | 707/201 |
| 5,794,253 A | | 8/1998 | Norin et al. | 707/203 |
| 5,799,306 A | | 8/1998 | Sun et al. | 707/10 |
| 5,802,524 A | * | 9/1998 | Flowers et al. | 707/103 R |
| 5,806,075 A | * | 9/1998 | Jain et al. | 707/201 |
| 5,857,203 A | * | 1/1999 | Kauffman et al. | 707/200 |
| 5,896,506 A | * | 4/1999 | Ali et al. | 709/213 |
| 5,926,624 A | * | 7/1999 | Katz et al. | 709/217 |
| 5,940,594 A | * | 8/1999 | Ali et al. | 709/203 |
| 5,991,768 A | | 11/1999 | Sun et al. | 707/104.1 |
| 6,035,303 A | * | 3/2000 | Baer et al. | 707/103 R |
| 6,052,724 A | * | 4/2000 | Willie et al. | 709/223 |
| 6,070,228 A | * | 5/2000 | Belknap et al. | 711/118 |
| 6,088,721 A | | 7/2000 | Lin et al. | 709/214 |
| 6,182,151 B1 | * | 1/2001 | Cheng et al. | 719/310 |
| 6,211,869 B1 | * | 4/2001 | Loveman et al. | 715/723 |
| 6,256,636 B1 | * | 7/2001 | Choy | 707/103 Z |
| 6,260,040 B1 | * | 7/2001 | Kauffman et al. | 707/10 |
| 6,263,342 B1 | * | 7/2001 | Chang et al. | 707/103 R |

(Continued)

OTHER PUBLICATIONS

Mike Duckett, "The Two-Phase Commit Protocol", Apr. 30, 1995, pp. 1-4.*

(Continued)

*Primary Examiner*—Luke S Wassum
*Assistant Examiner*—Linh Black
(74) *Attorney, Agent, or Firm*—Sawyer Law Group

(57) ABSTRACT

A system and method in accordance with the present invention provides for replication in a content management system. Replication is provided by utilizing the library server to track the objects to be replicated within the system. The replication is accomplished by adding two tables to the library server, a copies table and replicate table. The copies tables includes three new parts flags. A first flag identifies an ending as a copied part. A second flag identifies that other copies of this part exist. Finally a third flag identifies that a part is not yet available.

20 Claims, 11 Drawing Sheets

U.S. PATENT DOCUMENTS

| | | | |
|---|---|---|---|
| 6,272,488 B1* | 8/2001 | Chang et al. | 707/4 |
| 6,370,541 B1* | 4/2002 | Chou et al. | 707/103 X |
| 6,393,442 B1* | 5/2002 | Cromarty et al. | 715/523 |
| 6,434,680 B1* | 8/2002 | Belknap et al. | 711/161 |
| 6,449,627 B1* | 9/2002 | Baer et al. | 715/514 |
| 6,516,356 B1* | 2/2003 | Belknap et al. | 719/328 |
| 6,611,840 B1* | 8/2003 | Baer et al. | 707/102 |
| 6,839,748 B1* | 1/2005 | Allavarpu et al. | 709/223 |
| 6,871,203 B1* | 3/2005 | Benson et al. | 707/10 |
| 2002/0174122 A1* | 11/2002 | Chou et al. | 707/100 |
| 2003/0018624 A1* | 1/2003 | Hsiao et al. | 707/3 |

OTHER PUBLICATIONS

Xiannong Meng, "Two-Phase Commit Protocol", May 4, 2001, pp. 1.*

Andre Larsen Risnes, "Two-Phase Commit Protocol", Dec. 14, 2000, pp. 1-3.*

B. S. Boutros, B.C. Desai, "A two-phase commit protocol and its performance", IEEE, 2002, pp. 1.*

Andre Larsen Risnes, "The Two-Phase Commit Protocol", Dec. 14, 2000, pp. 1-3, "www.vermicelli.pasta.cs.uit.no/ipv6/students/andrer/doc/html/node18.html".*

* cited by examiner

503

METHOD AND SYSTEM FOR OBJECT REPLICATION IN A CONTENT MANAGEMENT SYSTEM

CROSS REFERENCE TO RELATED APPLICATION

The present application claims priority under 35 U.S.C. §119(e) of Provisional U.S. Patent Application Ser. No. 60/265,187 filed Jan. 30, 2001.

FIELD OF THE INVENTION

The present invention relates generally to a content management system and particularly to a system for object replication in such a system.

BACKGROUND OF THE INVENTION

Content management systems provide many services for the management of digital content. The basic client functions are logon, logoff; create folder, item or part; index item or part; search indexes; retrieve folders, item or parts; store parts; replace parts; and delete parts. In addition, a plurality of other features could be provided such as encryption, system administration, streaming of audio and video, caching functions or other types of management functions.

Content Management System Block Diagram

FIG. 1 illustrates the basic data flow in a content management system 100. The system includes a client 102, library server 101 and a plurality of object servers 103a–103c. The client 102 comprises an application and a toolkit. The toolkit includes a daemon process 106 that sends and receives data on behalf of the client. The client makes requests to the library server 101 and receives results. Objects are transported between a plurality of object servers 103a–103c and a plurality of the daemon process of the client as directed by the library server 101.

A given object is defined by an entry in the index or list of objects by a unique identifier and coupled with searchable attributes including the file or object server identifier and a collection identifier. The collection identifier describes how the object is to be managed for storage. A collection is a unit of storage conceptually a cabinet where objects are placed. It may consist of many volumes of various storage media and a set of rules as to how the actual objects are stored and handled. The library server 101 and each of the plurality of object servers 103a–103c are utilized in the conventional content management system 100 to manage digital content. Their functions are described below.

For a further description of the basic functions of the library server 101 and one of the plurality of object servers 103, refer now to the following discussion in conjunction with the accompanying figures.

Library Server 101

FIG. 2 is a diagram that illustrates the various elements of a conventional library server 101. The library server 101 holds index, attribute and content information in a searchable form within a relational database or through auxiliary servers. In a preferred embodiment, the library server 101 contains a foldering system and references to data objects that may be stored on an object server or other external file systems. The data objects may be any type of digitized information. The library server 101 also typically contains a workflow system.

As is seen, the conventional library server comprises a command monitor 120, a jobber 122, a plurality of child processes 124a–124e, and a database 126. The function of each of these elements will be described hereunder.

Command Monitor 120

The command monitor 120 is the main line for server code. The command monitor 120 also provides server control logic and starts other processes.

Jobber 122

The jobber 122 builds static access modules for the database to improve query performance.

Child Processes 124a–124e

The child processes 124a–124e perform requests from the clients (over the network, for example). The requests include but are not limited to query, add, update, attribute data, passes on store, retrieve, replace requests for objects to object server. The number of child process is configurable.

Database 126

The database 126 stores attribute and server control information. The database 126 of the library server 103 is accessed as needed by the child processes.

The library server 101 also includes a plurality of tables. The tables include a part table, object server table, and a collname table.

Parts Table 127

The function of the parts table 127 is described hereinbelow. One row of the table exists for each part. Parts are stored on object servers. The row identifies the item part and maps its location to an object server collection.

Object Server Table 129

The object server table 129 maintains information concerning the plurality of object servers.

Collname Table 131

The collname table 131 maintains the names of each collection for each object server.

Object Servers 103a–103c

Each of the object servers 103a–103c holds objects as files or references to other storage systems. The object server provides for name translation from library server name to file system name/location and for hierarchical storage management and transport of objects. Each of the object servers 103a–103c in a preferred embodiment also stores meta information in a relational database and in transaction log files. Finally, each of the object servers 103a–103c in a preferred embodiment also stores objects in files or other storage subsystems.

FIG. 3 is a diagram, which illustrates the various elements of a conventional object server 103. As is seen, the conventional object server comprises a command monitor 105, a purger 107, a destager 109, a migrator 111, child processes 112a–112e, a staging area 114, a plurality of volumes 116, and a database 118. The functions of these elements are described below.

Command Monitor 105

The command monitor 105 is a main line for server code, provides server control logic and starts other processes.

Purger 107

The purger 107 cleans the cache and removes least recently used items.

Destager 109

The destager 109 moves objects from cache to first storage class. The destager 109 maps a storage class to one or more volumes or to another object server. In the destager 109 mapping information is encoded in the database.

Migrator 111

The migrator 111 is an object server process that implements the storage manager activity moving objects from initial permanent storage to subsequent storage. The migrator 111 moves objects from one storage class to another storage class. Movement is defined by time and sequence as part of a management class.

Child Processes 112a–112e

The child processes 112a–112e perform the requests passed from the library server 103 to the client 102 daemon processes (over the network). The child processes 112a–112e store, retrieve, and replace requests for objects to object server. The number of child processes 112a–112e is configurable.

Staging Area 114

The staging area 114 is a cache area for object storage.

Volumes 116a–116d

Volumes 116a–116d are permanent storage media. The volumes 116a–116d may be disk, tape, optical or any type of storage subsystem.

Database 118

The database 118 holds object location and name mapping, and the system managed storage information and replication work requests and server configuration information.

A feature within the object server 163 is an object server table 121. The function of the object server table 121 is described below.

Object Server Table 121

The object server table 121 provides the objects that are stored and managed by that object server. One row within the table exists for each object stored and managed by the object server. The row identifies the object and maps its identifier to a local filename.

Functional Description

The function of the conventional content management system 100 (FIG. 1) is typically transactional in nature. A typical process for a transaction in a content management system is an object store process. In an object store process objects are stored in the appropriate locations within the system. FIGS. 4–6 are diagrams that illustrate conventional process for storing an object in a content management system.

First, in a begin transaction (FIG. 4), the client calls the application programming interface to store a part, via step 402. A memory pointer is then passed to the daemon within the client for use when an object server requests the part, via step 404. The store request contains the item and part information.

FIG. 5 illustrates a retrieve process. After receiving the store request from the client, the library server validates the store request and determines the destination information for this part, via step 502. The library server also inserts a row into the parts table. The library server then sends the store request to the selected object server, via step 504. This store request contains the part name, collection name, object size, daemon address and port, and time information.

After the object server receives the store request, the selected object server validates the store request and determines a storage location for the part, via step 506 (possibly a cache). The object server reserves file space for the object. The object server also logs the file location and cleans up resources. The object server then requests from the client a daemon to allow for sending the object, via step 508.

After receiving the request, the client daemon validates the object request and matches the object request to information passed from the client, via step 510. Then the daemon sends a response with the object appended thereto to the object server, via step 512. The object server places the object in prepared file space. Then the object server inserts a row into the object table. Finally, the object server sends a store response to the library server, via step 514. The library server then checks the response and sends a store response to the client, via step 516.

Thereafter the end transaction process is initiated as illustrated by FIG. 6. In the end transaction process the client receives the store response from the library server, via step 602. Then, the client sends an end transaction commit request to the library server, via step 604. The library server then sends an end transaction commit request to each object server contacted in this unit of work, via step 606.

Then, each of the object servers contacted adds a commit record to its respective transaction log and commits the database changes, via step 608. Each of the object servers then sends an end transaction response to the library server, via step 610. Each of the object servers processes their transaction logs.

After the library server receives the end transaction response from each of the object servers, the library server checks for any response errors, and sends an end transaction response to the client, via step 612. The transaction is now completed and the client inspects the results, via step 614.

Although this typical process is utilized extensively to manage data, it is oftentimes desired that multiple replicas of an object or different object servers be resident within the system. Replication provides for reliability in a variety of ways. For example, it can be utilized as part of a comprehensive data security model to provide offsite storage. In addition, replicated parts lost due to a hardware, software or administrative error can be recovered by a utility if a copy exists. It also provides for availability of objects. For business, legal or regulatory reasons (depending on locale) objects (possibly legal documents) may be required to reside on certain classes of media, such as optical.

The performance characteristics of this media may conflict with the desired access rate for a given customer. Replication to a faster media can enable keeping a copy on the legal storage medium and a copy on fast access medium over a longer defined period than normal caching practices permit. Replication also provides backup redundancy, the ability to maintain a copy at two or more sites. Higher availability of objects is also achieved via multiple peer copies.

However, in conventional content management systems replication systems have not been implemented. One way of replicating objects is to replicate an entire database in a plurality of object servers. This would greatly increase the complexity and could affect the performance of the content management system. Such a system would require significant "intelligence" in each of the object servers to identify which object server has copies such that one object server would have to be able to identify if another object server has the desired object therewithin.

Accordingly, what is needed is a system and method for object replication, which does not significantly affect the cost and efficiency of the content management system. The present invention addresses such a need.

SUMMARY OF THE INVENTION

A system and method in accordance with the present invention provides for replication in a content management system. Replication is provided by utilizing the library server to track the objects to be replicated within the system. The replication is accomplished by adding two tables to the library server, a copies table and replicate table. The copies tables includes three new parts flags. A first flag identifies an ending as a copied part. A second flag identifies that other copies of this part exist. Finally a third flag identifies that a part is not yet available.

DETAILED DESCRIPTION

The present invention relates generally to a content management system and particularly to a system for object replication in such a system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system and method in accordance with the present invention provides for replication in a content management system. The library server tracks the objects to be replicated within the system. In a preferred embodiment, a three valued logic is utilized for replication of an object: (1) part does not exist; (2) part will exist; and (3) part exists. The replication is accomplished by adding two tables to the library server, a copies table and replicate table. The copies tables includes three new parts flags. A first flag identifies that a copied part exists. A second flag identifies that other copies of this part exist. Finally a third flag identifies that a part is not yet available. The flag additions also apply to the parts table.

All the operations are kept simple and between only two servers at a time using a two-phase commit protocol. This reduces the complexity and allows operations to proceed where they would be unable to proceed if requiring 3 servers and one was not available.

Figure 1:
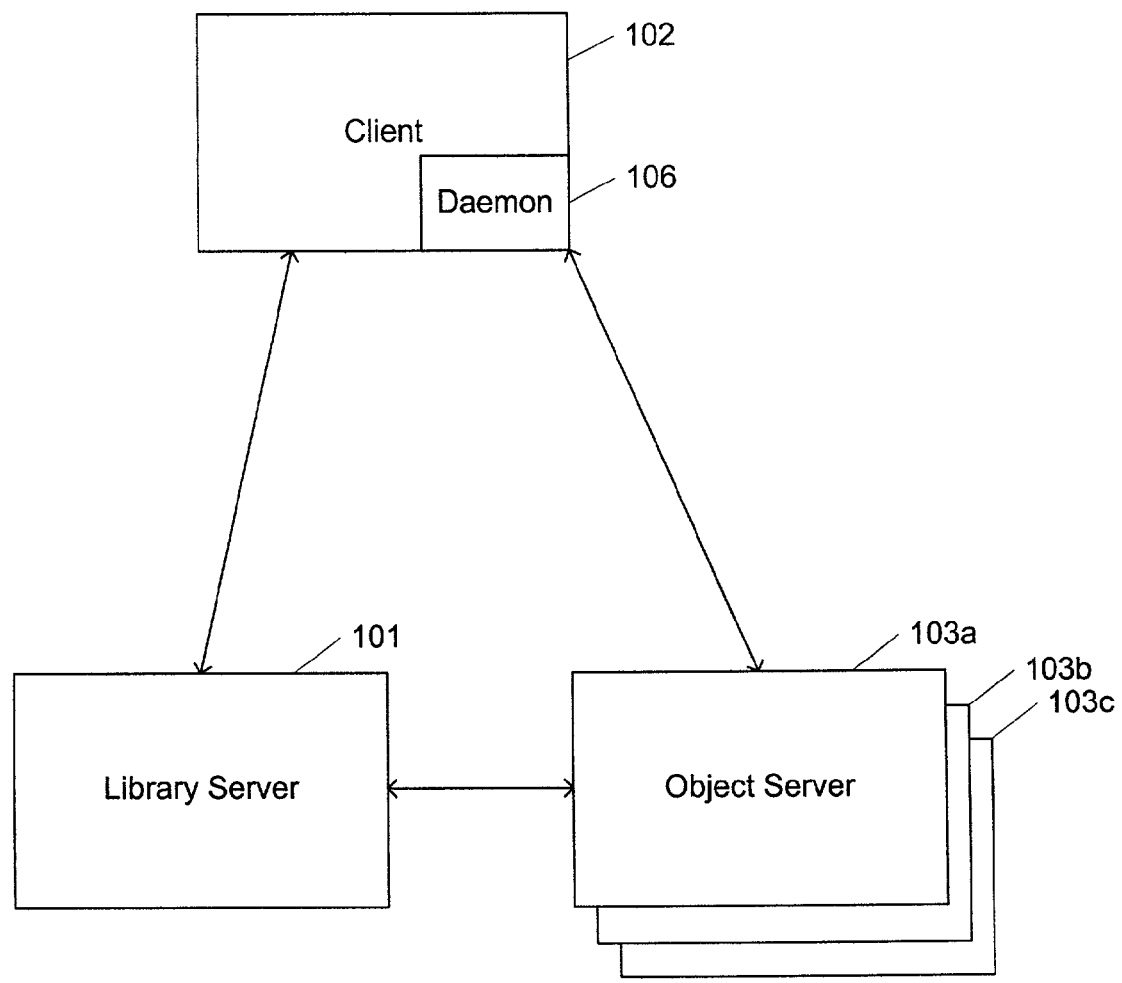
FIG. 1 illustrates the basic data flow in a content management system.
Figure 2:
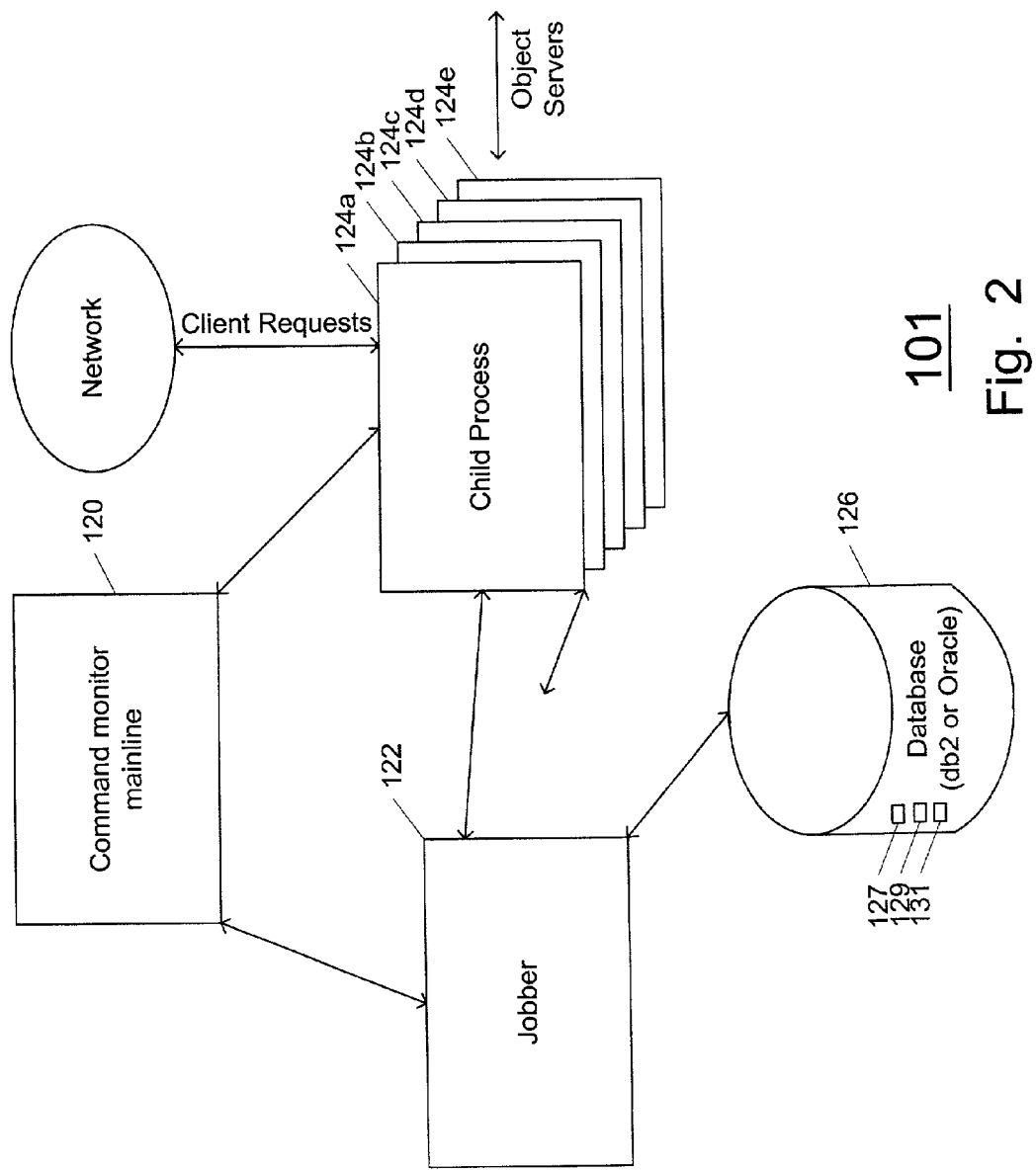
FIG. 2 is a diagram that illustrates the various elements of a conventional library server.
Figure 3:
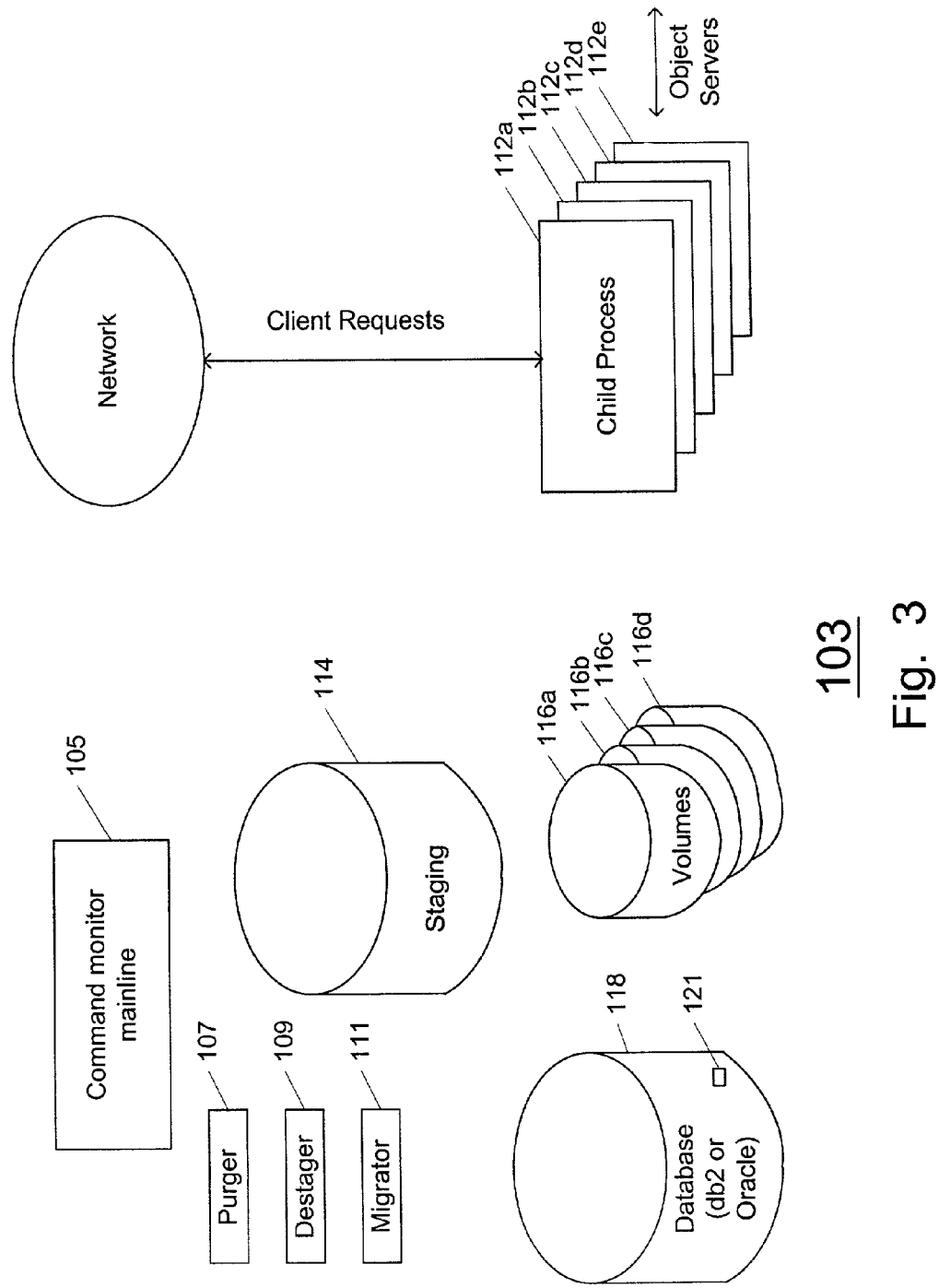
FIG. 3 is a diagram that illustrates the various elements of a conventional object server.
Figure 4:
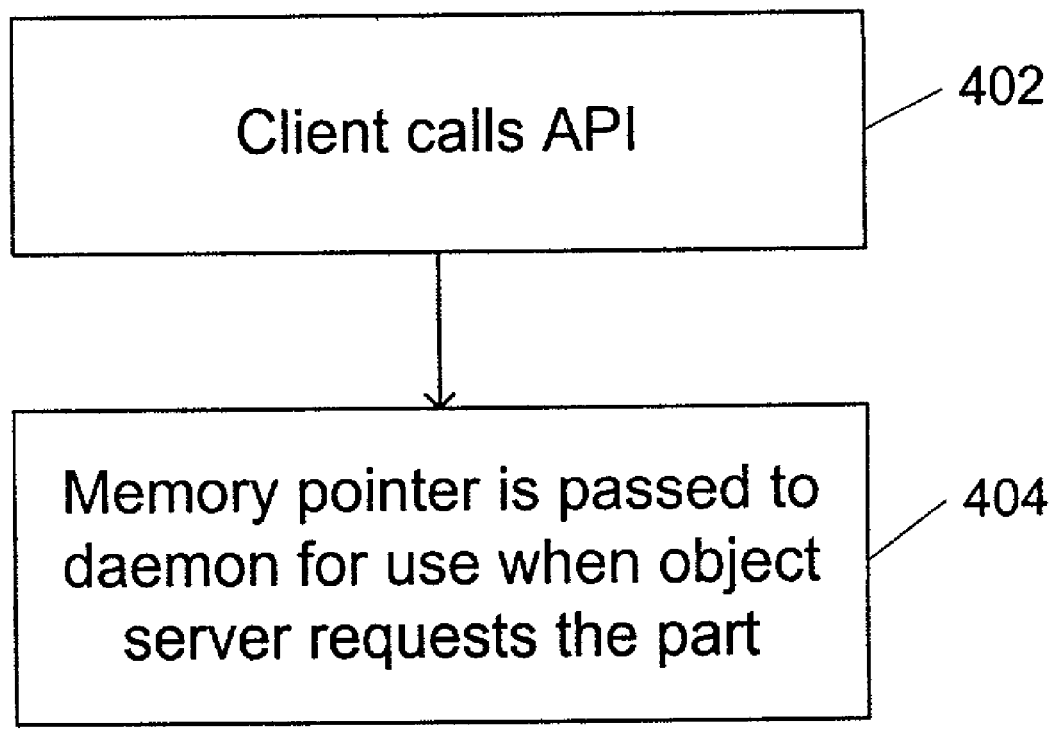
FIGS. 4–6 are diagrams that illustrate conventional process for storing an object in a content management system.
Figure 5:
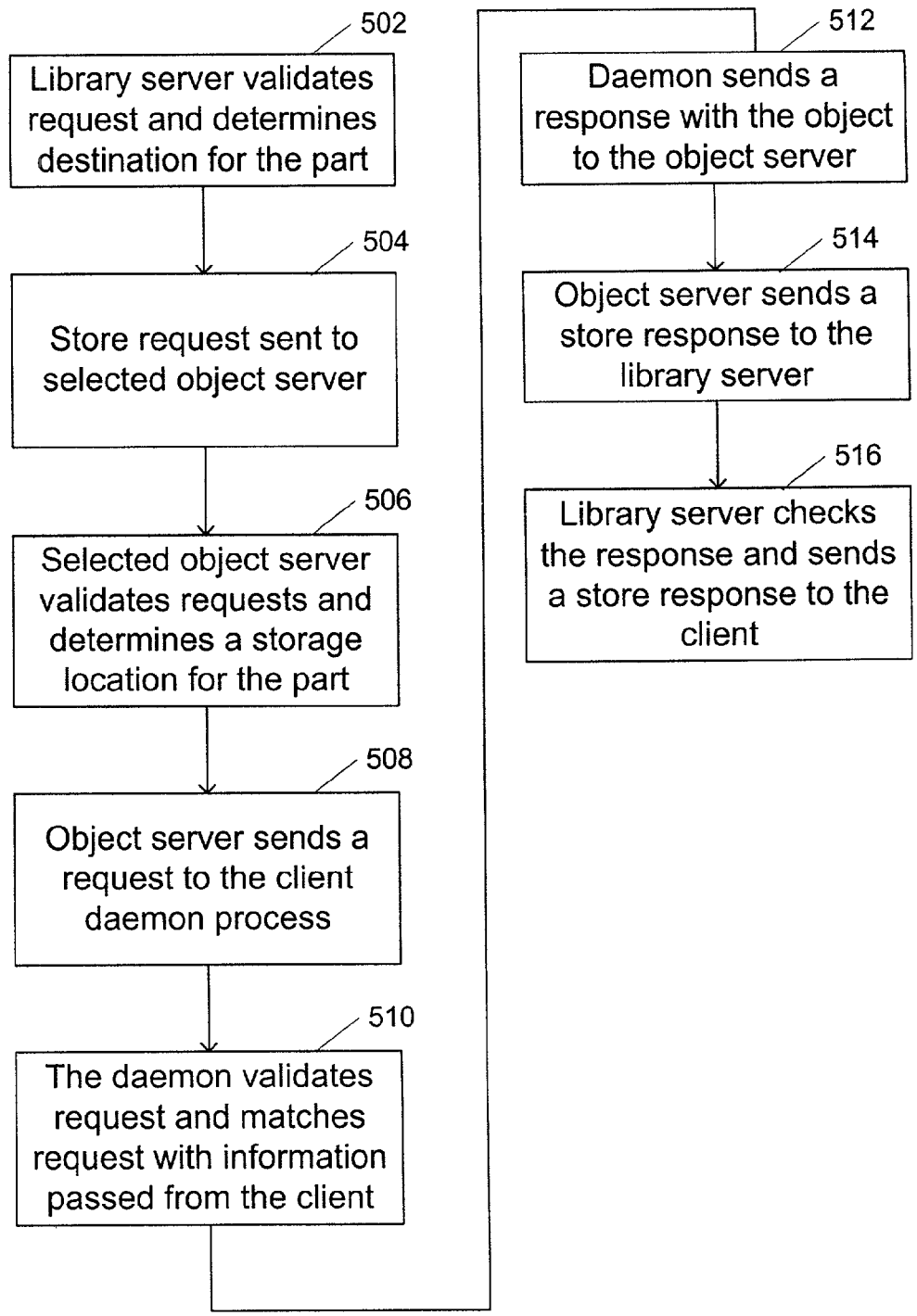
Figure 6:
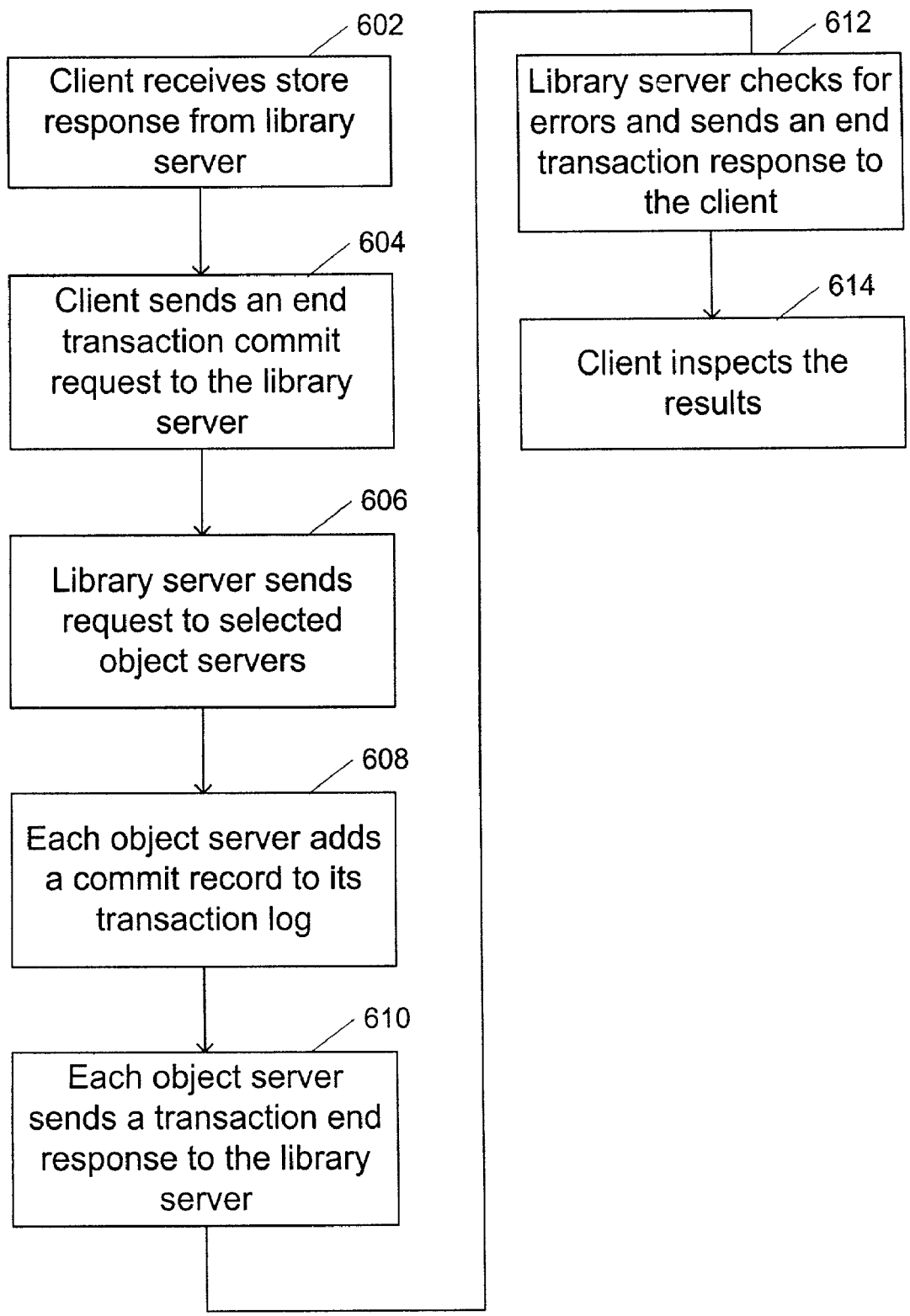

A content management system that includes replication in accordance with the present invention utilizes many of the same elements as described in FIGS. 1, 2 and 3. To provide replication functionality is provided in the library server. Utilizing this functionality, the entire database of the object servers does not have to be replicated, thereby minimizing the complexity and intelligence required in each of the object servers. In so doing, a replication system is provided which is simple, easy to implement and compatible with existing content management systems.

To describe the key features of the present invention in more detail refer now to the following description in conjunction with the accompanying drawings.

Library Server 501

Figure 7:
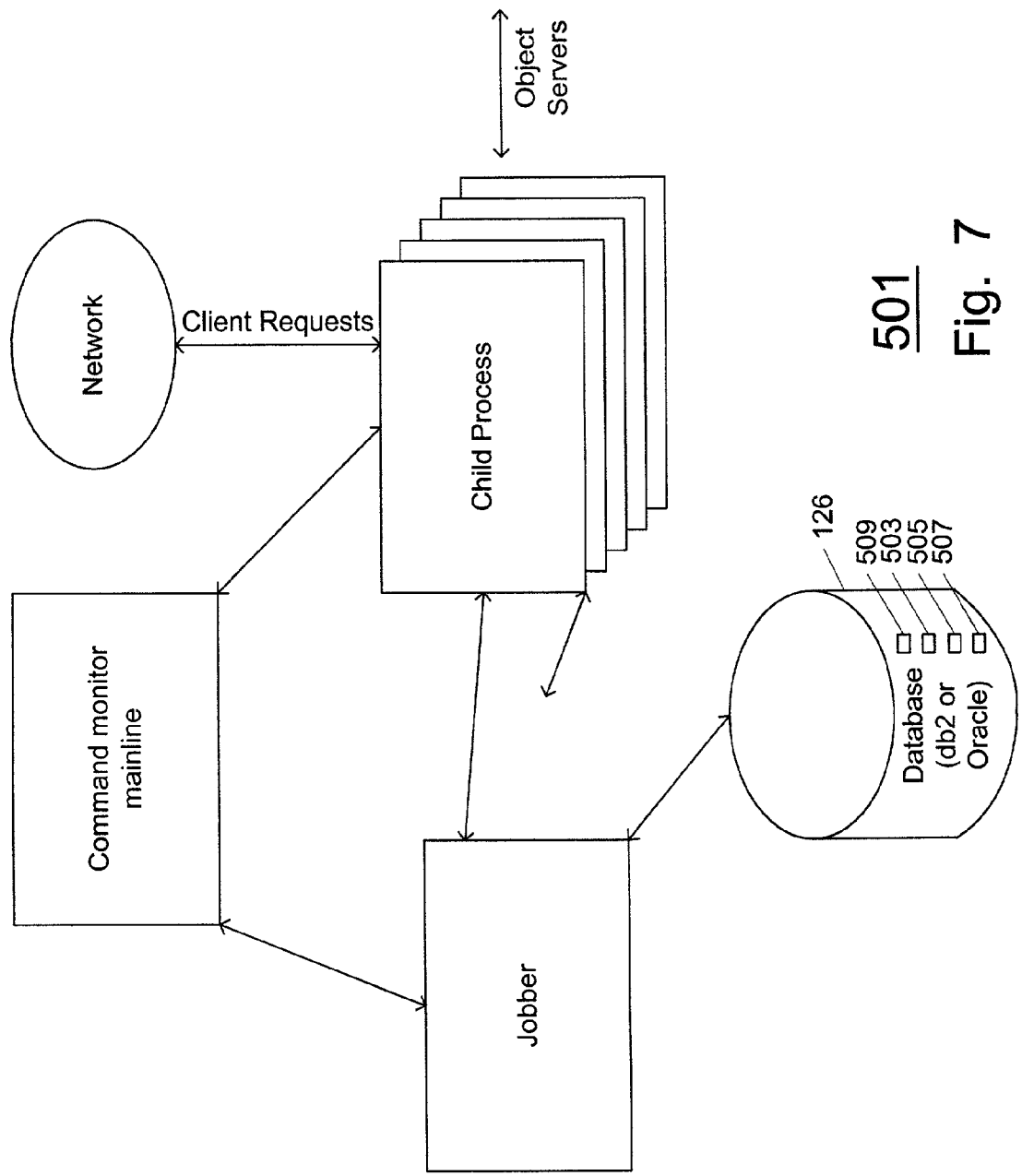
FIG. 7 is a diagram of a library server in accordance with the present invention.

FIG. 7 is a diagram of a library server 501 in accordance with the present invention. Library server 501 has elements that are similar to those described in the library server 101 (FIG. 3) of the conventional content management system 102 (FIG. 1). In addition to the functions already described with reference to FIG. 2, the library server 501 includes additional tables and modifications to existing tables to support replication. These changes will be described hereinbelow.

Copies Table 503

In a preferred embodiment of the copies table 500, one row of the table exists for each replicated part. Replicated parts are stored on object servers as peers and are then managed as individuals. Three new part flags are added:

IS_A_REPLICA

This flag identifies an entry as a copied part.

HAS_REPLICAS

This flag identifies that other copies of this part exist.

REPLICATION_PENDING

This flag identifies that a copy of the part is not available.

Replicate Table 505

In a preferred embodiment of the replicate table 505, one row of the table exists for each defined replication of a collection. A replication is defined from a source object server collection to a target object server collection. There is no long-term relationship. The replication information is inherited by each part at first store time. The theoretical design puts no limits on the number of replicas but the table limit is the size of a small integer and the internal implementation has a limit of 128 replicas per object server collection. The source object server collection cannot equal the target object server collection.

Object Server Table 507

In a preferred embodiment of the object server table 507 within the library server 501, one row of the table exists for each defined object server (referenced by the replicate table 505).

Collname Table 509

In a preferred embodiment of the collection (collname) table 504, one row of the table exists for each defined collection (referenced by replicate table 505).

Object Server 503

Figure 8:
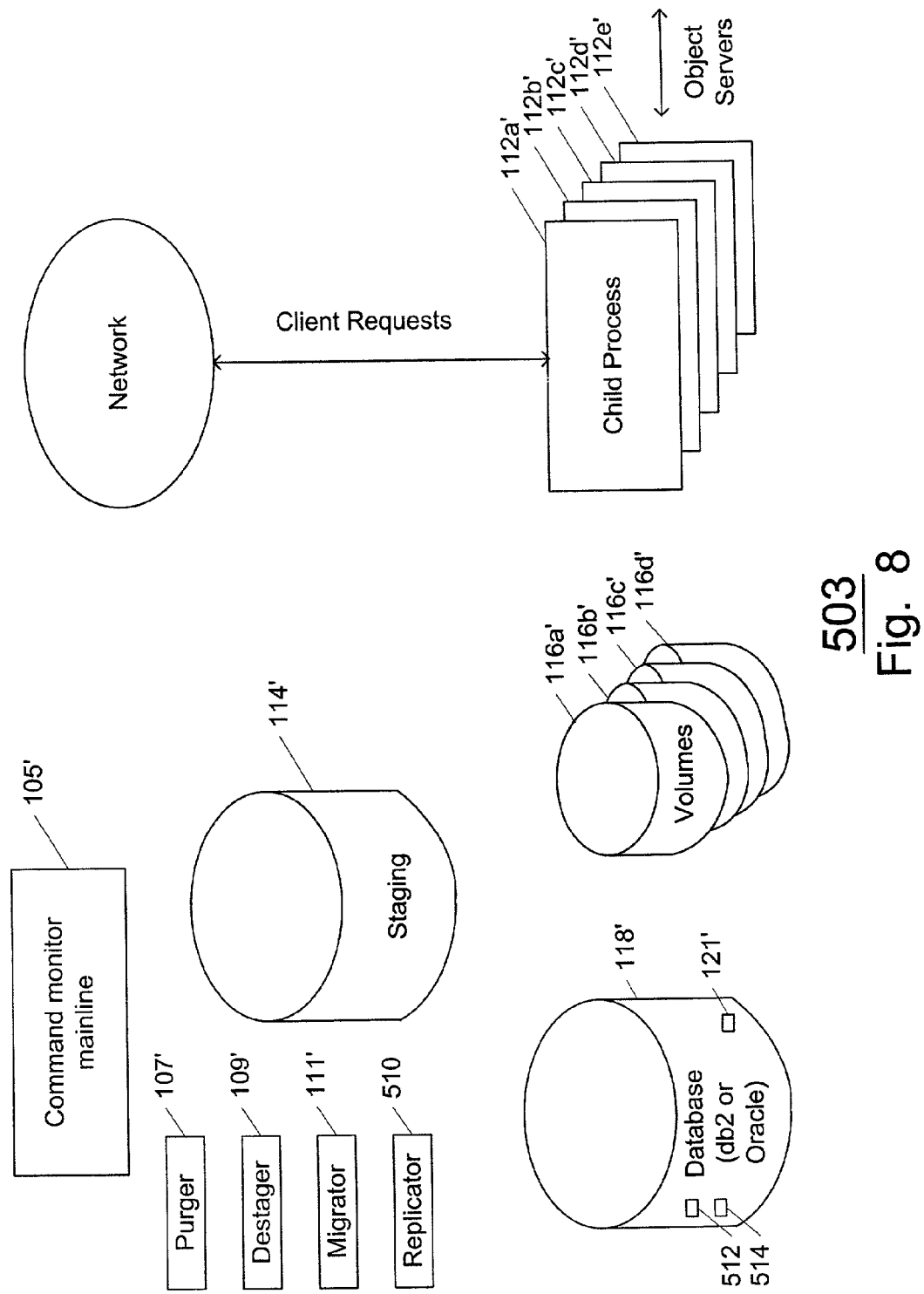
FIG. 8 illustrates an object server in accordance with the present invention.

FIG. 8 illustrates an object server 503 in accordance with the present invention. Each of the plurality of the object servers 503 has similar elements to those described with the object server 103 of FIG. 3 but also includes one additional element, one additional table and a modification to the object server table to support the replication request.

The additional element comprises a replicator 510. Its function will be described below.

Replicator 510

The replicator 510 provides for movement of objects from one collection to another collection from a list of requests received on behalf of the library server. The replicator informs the library server on successful completion of these tasks. The replicator 510 moves objects from source collection to target collection.

In addition there is one new table in the object server, a replication table.

Replication Table 512

One row of the table exists for each pending replication request within the table. Actions defined by replicate type include but are not limited to, for example:
 "A" pending restore from a sync utility.
 "D" delete this replica.
 "N" insert replica information into library server copies table. This action is used to force object replication.
 "L" inform library server replication for this object is complete.
 "R" replicate this object to target.
 "S" restore this object from a copy.

Object Server Table 514

A collection ID is provided to accommodate replication with the object server table 514.

To illustrate how a content management system in accordance with the present invention provides for replication, an object store process, which includes replication, will be described hereinbelow.

Object Store Process

Figure 9:
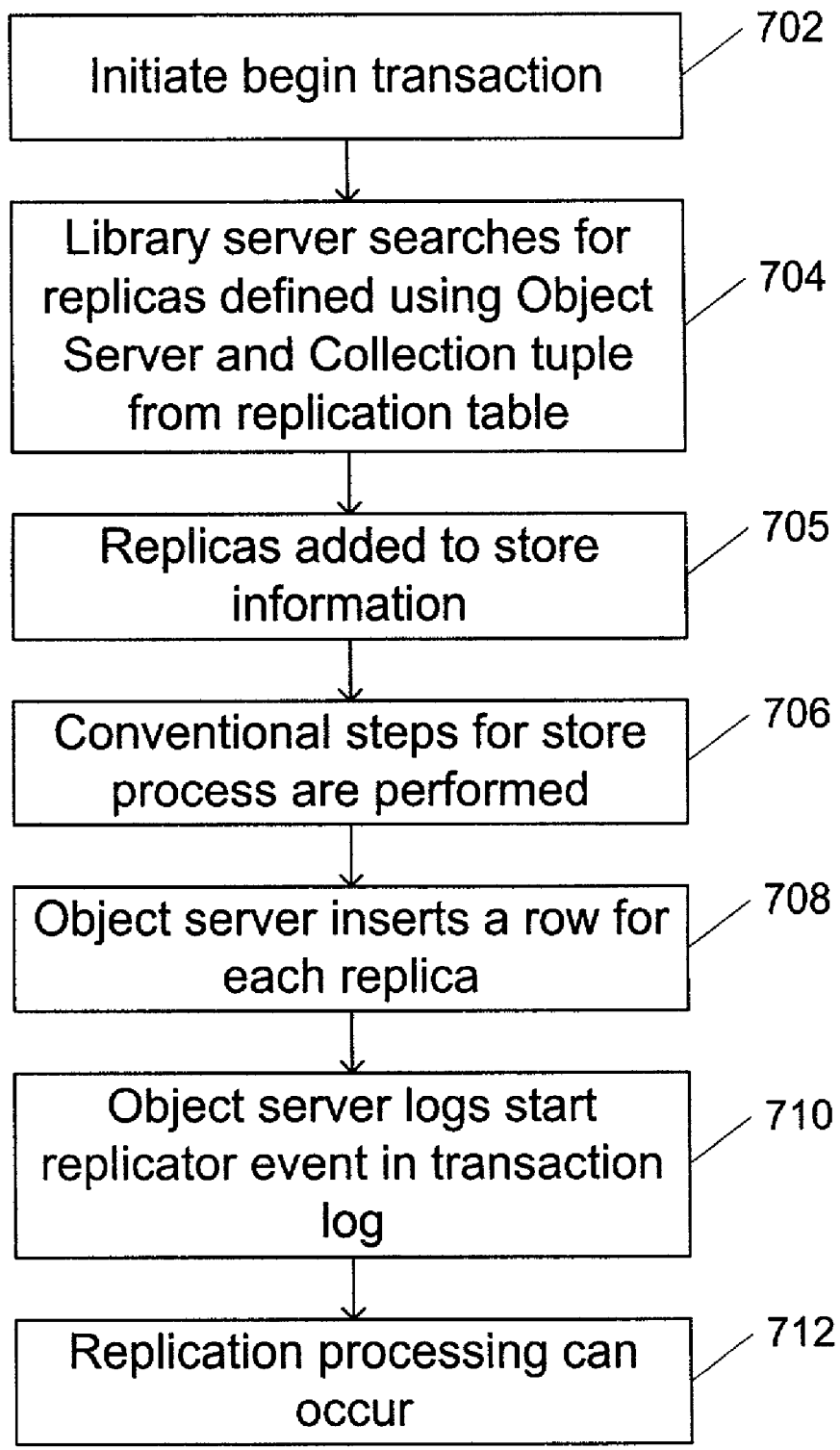
FIG. 9 is a flow chart that illustrates an object store process that includes replication.

FIG. 9 is a flow chart, which illustrates an object store process, which includes replication. First, the begin transaction is initiated, via step 702. The library server searches for any replicas defined using an object server node and Collection name tuple from the replication table, via step 702. If one or more replications are defined then the HAS_REPLICAS flag is set. The library server inserts a row for each copy in the COPIES table with the IS_A_REPLICA, HAS_REPLICAS, REPLICATION PENDING flags set, via step 705. The library server name, number of replicas and an object server name and collection tuple is sent for each replica. Then the conventional steps for the store process are performed, via step 706. Thereafter the end transaction process is initiated.

In the end transaction process, the object server inserts a row for each replica, which can include in a preferred embodiment object name, library server name, target object server name, target object server collection, file size, timestamps, and an action code into the object server replication table, via step 708. Then the object server logs a start replicator event in the transaction log, via step 710. After the object store process has completed, replication processing can occur, via step 712. Replication processing is described in detail hereinbelow.

Replication Processing Phase 1

Figure 10:
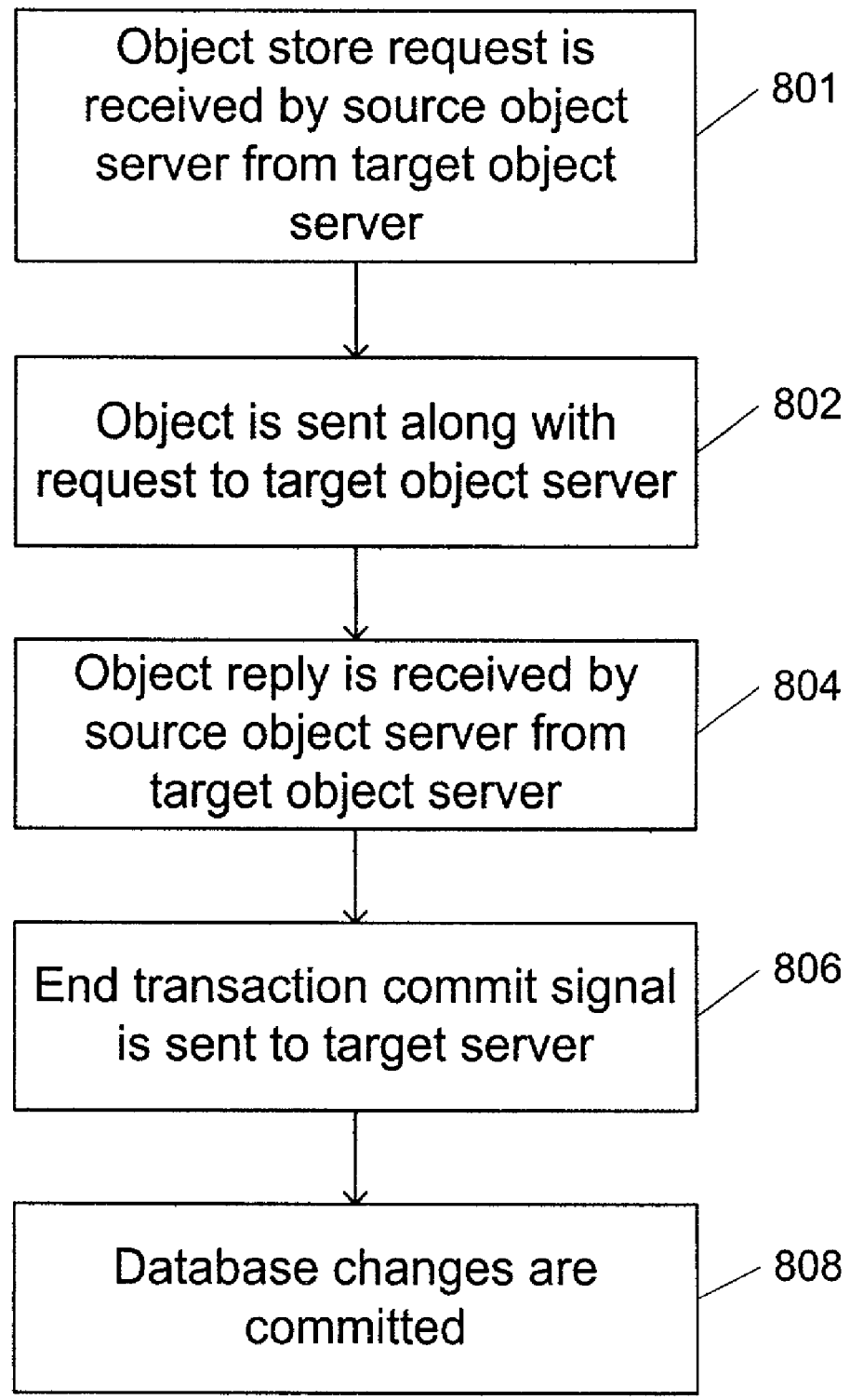
FIG. 10 illustrates the first replication processing phase, i.e., replicating an object between a source object server to a target object server.

FIG. 10 illustrates the first replication-processing phase, i.e., replicating an object between a source object server to a target object server. First, a request is received by a source object server from a replicate table, via step 801. The object when replicated is sent along with request to the target object server, via step 802. Next, an object reply is received by the source object server from the target object server, via step 804. If reply is OK a row is marked as valid in the replication table source object server.

Steps 802 and 804 are repeated a predetermined number of times to sort replications for optimized access order.

Thereafter, end transaction commit signal is sent to the target server, via step 806. Finally, the end transaction reply is received by the source object server and if the reply is OK, replica is committed, via step 808.

Replication Processing Phase 2

Figure 11:
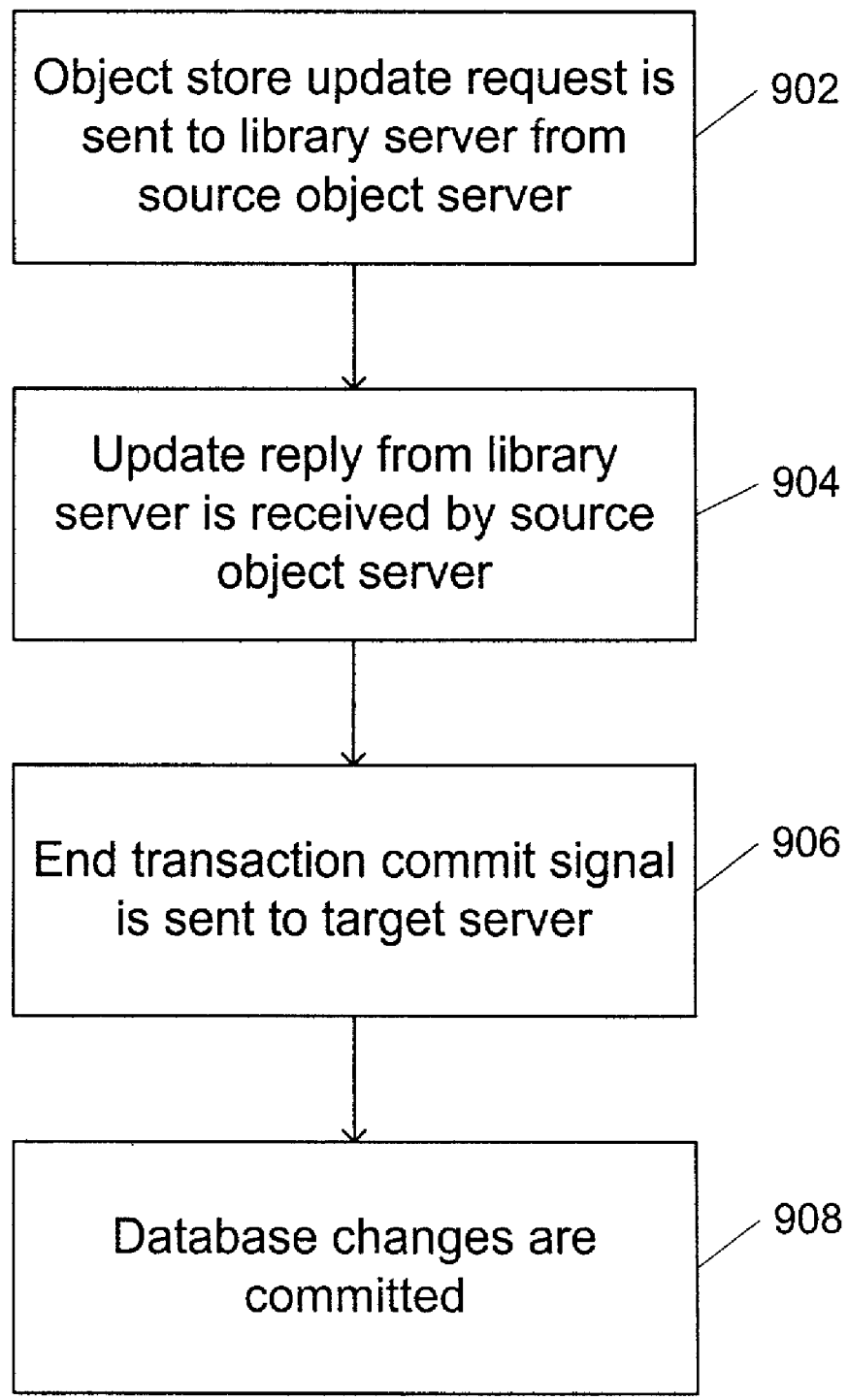
FIG. 11 illustrates the second phase of replication; i.e., the source object server informing the library server that replication for the object is complete.

FIG. 11 illustrates the second phase of replication; i.e., the source object server informing the library server that replication for the object is complete. First, an object store update request is sent to the library server from the source object server, via step 902. Next, update reply from the library server is received by the source object server, via step 904. If reply is valid, a row in replication table of source object server is deleted. Steps 902 and 904 are repeated to sort replications for optimized access order.

Next, an end transaction commit signal is sent to the library server, via step 906. Finally, end transaction reply is received, via step 908, and if OK, the database changes are committed and the replication is complete.

There are a plurality of replication operations supported by the above-identified system. They include but are not limited to retrieve, replacement, and delete operations. Each of these operations is described below.

Replication Operations

1. Retrieve Operator

If primary part in parts table is unavailable and the part has the HAS_REPLICAS flag set, the library server inspects the copies table for the list of replicated parts.

2. Replacement Operator

If the original part has copies the replacement request contains replication information to allow the distribution of the new copies. If the original is not available the Library Server can use a copy.

3. Delete Operator

If the original part HAS_REPLICAS flag is set the copy information is delivered along with the delete request.

Conclusion

A system and method in accordance with the present invention has the following advantages:

Replication is Performed at a Part Level

Replications requests are safe and guaranteed at transaction commit time. Accordingly, replications are performed outside the transaction scope as a long running transaction and replications are done in their own transaction scope.

For example, the replication process can be controlled, using a weekly schedule; each day may have a single period of time that will allow the replication process to run.

Defined Replications are an Attribute of the Collection

The replication attributes of a collection are inherited by the entities (parts) at initial store time. This is essential to guard against circular replications. The replication attributes of a collection may be changed at any time. In a preferred embodiment, up to 128 replicas may be defined per collection.

Replicated Parts are Treated as Peers by Object Server

Replications may be added for any part and replications may be coalesced into a single part via the normal migration process.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the specification.

What is claimed is:

1. A method for replicating an object, in a content management system, wherein the content management system comprises at least one target object server, at least one source object server and a library server; the method comprising the steps of:
   (a) receiving a request for an object to be replicated by the at least one source object server by the at least one target object server;
   (b) committing the replica by the at least one the source object server; and
   (c) authorizing the replication by the library server after steps (a) and (b) wherein a three valued logic is utilized for replication of an object, wherein the three valued logic comprises (1) part does not exist, (2) part will exist and (3) part exists.

2. The method of claim 1 wherein the at least one object server includes a replicate table.

3. The method of claim 2 wherein the library server searches for replicas in the replicate table.

4. The method of claim 3 wherein the replication table includes an object server name and a collection name.

5. The method of claim 4 wherein the library server obtains the object server name and collection name tuple from the replication table for replicas.

6. The method of claim 1 wherein the library server includes a copies table and a replication table.

7. The method of claim 6 wherein the copies table includes a first flag that identifies an entry as a copied part, a second flag that identifies that other copies of a part exist and a third flag that identifies that a copy of the part is not available.

8. The method of claim 7 wherein a plurality of actions are defined by a replicate type.

9. A computer readable medium containing program instructions for replicating an object in a content management system, wherein the content management system comprises at least one target object server, at least one source object server and a library server; the program instructions for:
   (a) receiving a request for an object to be replicated by the at least one source object server by the at least one target object server;
   (b) committing the replica by the at least one the source object server; and
   (c) authorizing the replication by the library server after steps (a) and (b) wherein a three valued logic is utilized for replication of an object, wherein the three valued logic comprises (1) part does not exist, (2) part will exist and (3) part exists.

10. The computer readable medium of claim 9 wherein the at least one object server includes a replicate table.

11. The computer readable medium of claim 10 wherein the library server searches for replicas in the replicate table.

12. The computer readable medium of claim 11 wherein the replication table includes an object server name and a collection name.

13. The computer readable medium of claim 12 wherein the library server obtains the object server name and collection name tuple from the replication table for replicas.

14. The computer readable medium of claim 9 wherein the library server includes a copies table and a replication table.

15. The computer readable medium of claim 14 wherein the copies table includes a first flag that identifies an entry as a copied part, a second flag that identifies that other copies of a part exist and a third flag that identifies that a copy of the part is not available.

16. The computer readable medium of claim 15 wherein a plurality of actions are defined by a replicate type.

17. A content management system comprising:
   a client;
   a library server for communicating with the client, wherein the library server tracks objects to be replicated in the system; and
   at least one object server for communicating with the client and the library server, wherein a two phase commit protocol is utilized for an operation, wherein a three valued logic is utilized for replication of an object, wherein the three valued logic comprises (1) part does not exist, (2) part will exist and (3) part exists.

18. The content management system of claim 17 wherein the library server obtains the object server name and collection name tuple from the replication table for replicas.

19. The content management system of claim 17 wherein the copies table includes a first flag that identifies an entry as a copied part, a second flag that identifies that other copies of a part exist and a third flag that identifies that a copy of the part is not available.

20. The content management system of claim 19 wherein a plurality of actions are defined by a replicate type.

* * * * *